(12) United States Patent
Bansal et al.

(10) Patent No.: US 6,680,909 B1
(45) Date of Patent: Jan. 20, 2004

(54) MEDIA ACCESS CONTROL SCHEDULING METHODOLOGY IN MASTER DRIVEN TIME DIVISION DUPLEX WIRELESS PICO-CELLULAR SYSTEMS

(75) Inventors: Deepak Bansal, New Delhi (IN); Manish Kalia, New Delhi (IN); Rajeev Shorey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/434,583

(22) Filed: Nov. 4, 1999

(51) Int. Cl.[7] ............................................. G01R 31/08
(52) U.S. Cl. ..................................................... 370/231
(58) Field of Search ................................ 370/474, 231, 370/329–324, 449, 503, 507, 347–350, 280, 310–314, 401, 334, 335; 375/322, 133–138, 222, 281, 345, 148–150, 140, 354; 455/69, 522, 434

(56) References Cited

U.S. PATENT DOCUMENTS

| 4,763,322 | A |   | 8/1988 | Eizenhofer |
| 5,274,841 | A |   | 12/1993 | Natarajan et al. |
| 5,297,144 | A |   | 3/1994 | Gilbert et al. |
| 5,506,848 | A |   | 4/1996 | Drakopoulos et al. |
| 5,548,809 | A | * | 8/1996 | Lemson ...................... 455/454 |
| 5,844,890 | A |   | 12/1998 | Delp et al. |
| 6,072,784 | A | * | 6/2000 | Agrawal et al. ............ 370/311 |
| 6,301,242 | B1 | * | 10/2001 | Lindsay et al. ............. 370/347 |
| 6,366,622 | B1 | * | 4/2002 | Brown et al. ............... 375/322 |

OTHER PUBLICATIONS

Songwu Lu et al,; Fair Scheduling in Wireless Packet Networks; Coordinated Science Laboratory, University of Illinois at Urbana–Champaign; 1997 ACM 0–89791–905–X/97/0009.

Songwu Lu et al.: A Wireless Fair Service Algorithm for Packet Cellular Networks; Coordinated Science Laboratory; U of Illinois; Oct., 1998.

C. Fragouli et al.; Controlled Multimedia Wireless Link Sharing via Enhanced Class–Based Queuing with Channel–State–Dependent Packet Schduling; U. of California, LA; 0–7803–4383–2/98 1998.

* cited by examiner

Primary Examiner—Chi Pham
Assistant Examiner—Prenell Jones
(74) Attorney, Agent, or Firm—Whitham, Curtis & Christofferson, P.C.; T. Rao Coca (57) ABSTRACT

Master-Slave Queue-State-Dependent Packet Scheduling Policies use the information about Master and Slave queues to achieve better system performance. The scheduling methodology is implemented at the Master and therefore has access to information about the Master queues. Different kinds of information about the queues such as backlog, size, delays can be used.

16 Claims, 6 Drawing Sheets

MEDIA ACCESS CONTROL SCHEDULING METHODOLOGY IN MASTER DRIVEN TIME DIVISION DUPLEX WIRELESS PICO-CELLULAR SYSTEMS

BACKGROUND OF THE INVENTION

1. Field of the Invention

The present invention generally relates to wireless communication systems and, more particularly, to a scheduling method that gives high system throughput and fairness among different connections in a wireless network.

2. Background Description

Most of the emerging pico-cellular wireless communication systems are Master driven Time Division Duplex (TDD) based systems. Conventional data packet scheduling strategies based on a Round Robin scheduling protocol perform poorly in these systems.

The physical constraints of the wireless medium often lead naturally to a Master-Slave configuration. In a Master-Slave configuration, one of the stations in a cell is the Master (this could be a fixed Access Point or a Base Station) and the other remote stations are Slaves (e.g., the handheld devices such as palmtop computers, cell phones, pagers).

Figure 1:
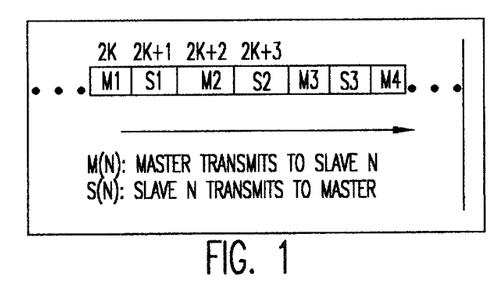
FIG. 1 is diagram illustrating alternate master-slave transmission slots.

The need for simplicity and low complexity has made Time Division Duplex (TDD) one of the promising candidates for medium access control (MAC) in wireless systems having a Master-Slave configuration. In TDD MAC, the forward (i.e., Master to Slave) and the reverse (i.e., Slave to Master) slots occur in pairs; that is, once data is sent by the Master in the forward slot, the subsequent slot is reserved for the Slave to transmit data, as illustrated in FIG. 1. Further, the asymmetry of base stations and mobile units and the resource scarcity at mobile units make it desirable in wireless systems to have most of the complexity at the Master. This mode of operation makes multiple access straight forward, since the Master provides a single point of coordination. Proposed standards for low-power, low-cost wireless mobile communication systems have adopted centralized TDD scheduling as the MAC protocol for scheduling access to the wireless medium.

Master driven TDD scheduling poses several challenges since the traditional scheduling policies do not perform well over this kind of a MAC. Once a Master polls a Slave, the next slot is reserved for the Slave irrespective of whether the Slave has data to send or not (see again FIG. 1). An efficient scheduling methodology would depend upon (i) the state of the queues at the Master and at the Slaves, (ii) the traffic arrival process at these queues, and (iii) the packet length distribution at the Master and the Slave. It is with this in mind that we propose a new scheduling method adapted for TDD MAC at the Master. The parameters of interest that we have studied are (i) system throughput, (ii) packet delays and (iii) fairness. Throughput is defined as number of slots utilized for transmitting data. Fairness is defined as equal bandwidth for different connections.

Scheduling methods which involve a-priori reservation of slots by the slaves have been proposed. See for example, U.S. Pat. No. 5,506,848 to Drakopoulos et al. for "Demand Assignment System and Method for Mobile Users in a Community of Interest ". However, in some systems, reservation of slots for data packets is not allowed. Due to the Master driven TDD structure, a Slave packet can only be transmitted after a Master packet.

In U.S. Pat. No. 5,274,841 to Natarajan et al. for "Methods for Polling Mobile Users in a Multiple Cell Wireless Network ", methods for polling mobile users have been discussed. However, the uplink wireless communication is done using CSMA (Carrier Sensing, Multiple Access) protocol.

A two stage non-contention based Multiple Access protocol is discussed in U.S. Pat. No. 5,297,144 to Gilbert et al. for "Reservation-based Polling Protocol for A Wireless Data Communications Network ". This protocol is based on Reservation based polling. The slot restrictions in some systems make such an approach infeasible.

In U.S. Pat. No. 4,763,322 to Eizenhofer for "Digital Radio Transmission System with Variable Duration Time Slots in the Time-Division Multiplex Frame ", a scheduling method with variable duration of the time slots in the time-division multiplex frame is discussed. However, the methodology is not applicable to a TDD system and has variable duration time slots (as opposed to systems having fixed size slots).

A scheduling method for providing proportional use of network bandwidth is proposed in U.S. Pat. No. 5,844,890 to Delp et al. for "Communications Cell Scheduler and Scheduling Method for Providing Proportional Use of Network Bandwidth. However, this method is not suited to some systems as it does not tackle the issues posed by Master driven TDD systems.

Scheduling Challenges in Master Driven TDD Wireless Pico Cellular Systems

Figure 2:
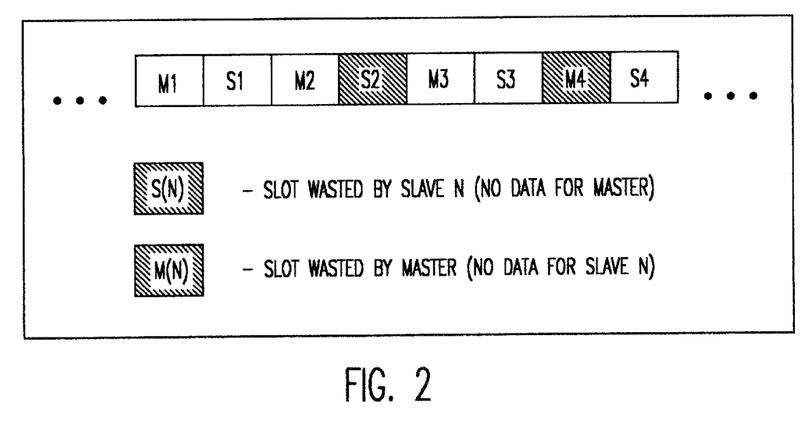
FIG. 2 is a diagram illustrating wasted transmission slots when a slave or a the master have no data to transmit.

In Master Driven TDD wireless systems, Master and Slave queues are served in pairs. If a Master has data to send and Slave has no data to send, the reverse slot is wasted, as illustrated in FIG. 2. In such systems, each Slave has a queue of data packets to be sent to the Master (we refer to this as the Slave queue from now onwards). Similarly, there is a queue at the Master for each Slave, containing data packets to be sent to the Slave.

We observe that different connections can have different slot utilization. To increase system throughput, we need to give more service to connections with less slot wastage. However, by doing so we are introducing unfairness (in terms of slots received by a connection) among different connections. We need scheduling methods that increase system throughput yet provide fairness. See, for example, C. Fragouli, V. Sivaraman and M. B. Srivastava; "Controlled Multimedia Wireless Link Sharing via Enhanced Class-Based Queueing and Channel-State-Dependent Packet Scheduling ", *IEEE INFOCOM* '98, San Franscisco, Calif., March, 1998; S. Lu, V. Bharghavan and R. Srikant, "Fair Scheduling in Wireless Packet Networks ", ACM SIGCOMM '97, August, 1997; and S. Lu, T. Nandagopal and V. Bharghavan, "A Wireless Fair Service Algorithm for Packet Cellular Networks ", *ACM MOBICOM* '98, Dallas, Tex., 1998.

Conventional Scheduling Policies: Round Robin

Figure 3:
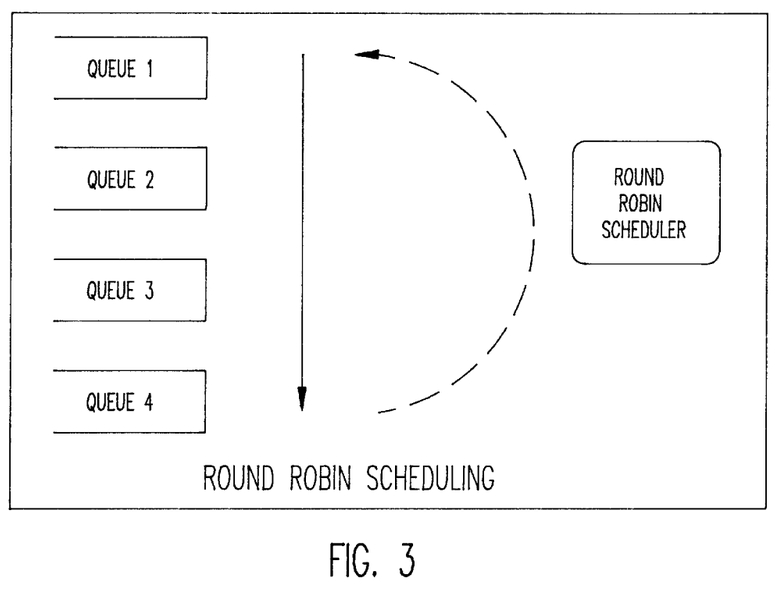
FIG. 3 is a diagram illustrating the round robin scheduling protocol.

The conventional scheduling policies are based on Round Robin (RR) Scheduling. In RR scheduling, different connections are visited in a cyclic order. FIG. 3 illustrates the scenario in RR scheduling.

In TDD Master driven systems the scheduling is done in pairs of queues rather than a single queue (Forward slot for the Master queue followed by the Reverse slot for the Slave queue). Conventional strategies like Round-Robin scheduling will give equal slot allocation to all the connections. Since different connections have different slot utilization, this can lead to significant slot wastage in RR scheduling.

SUMMARY OF THE INVENTION

It is therefore an object of the present invention to provide a scheduling method that provides high throughput and at the same time fairness in Master driven TDD wireless systems.

The scheduling policies that we propose can be labeled as Master-Slave Queue-State-Dependent Packet Schedulihng Policies. These policies use the information about Master and Slave queues to achieve better system performance. The scheduling methodology is implemented at the Master and therefore has access to information about the Master queues. Different kinds of information about the queues such as backlog, size, delays can be used.

As an example, in our scheduling policies we use the "backlog" information at the Master and Slave queues. A Queue is backlogged if it has packets to send. Denote by "1" the state in which a queue (Master or Slave) has data to send and by "0" when there is no data to send. Clearly, this leads to four distinct states of the Master-Slave queue pairs. For example, the Master-Slave "pair" is in the "1-1" state if both the Master and the Slave of a connection have data to send (are backlogged); if both Master and Slave have no data, this pair is in the "0-0" state.

The queue information about the Slaves can be communicated by various mechanisms to the Master. The communication may be through piggybacking information on packets or implicit mechanisms such as observing the system. In our policies, we convey the backlog information about the Slave queue to the Master by piggybacking a bit on the Slave to the Master packets, if any. This bit can be present in the headers or in the payload. For each packet the Slave sends, this bit is marked "1" or "0". It is marked "1" if there are more outstanding packets in the queue and "0" if there is no backlog.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

We present the K-Fairness Methodology. This methodology proceeds in two steps. In the first step, the connections are placed into categories based on some criteria (we explain the criteria below). In the second step, the K-Fairness methodology serves the connections depending on their category.

Categorization of Connections

We categorize connections based on the slot utilization. The connections with the highest slot utilization are placed in the first category (A). In this way we can have other categories of connections. This classification can be dynamic in nature; that is, connections can keep changing from one category to the other. The Master-Slave pairs in a "1-1" state (as defined above) are taken to be in category A. The Master-Slave pairs in "1-0" and "0-1" state are taken to be in the second category (B). Our objective is to give more service to the higher categories. The methodology proceeds with the following categories:

1. Category A: "1-1" Master-Slave pairs
2. Category B: "1-0", "0-1" Master-Slave pairs Note that "0-0" Master-Slave pairs are not scheduled.

Figure 4:
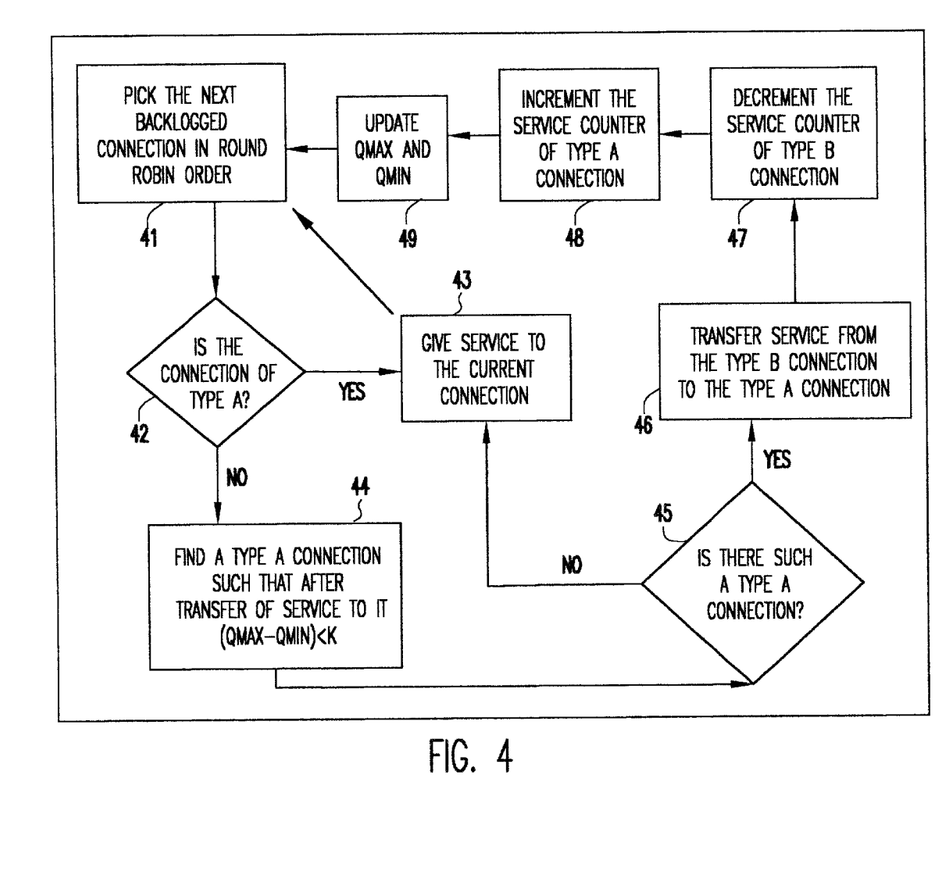
FIG. 4 is a flow diagram showing an implementation of the Master-Slave Queue-State-Dependent Packet Scheduling Policies according to the invention.

The K-Fairness methodology is illustrated in the flow-chart of FIG. 4, to which reference is now made. In function block 41, all the backlogged connections are visited in a Round Robin manner. (A connection is termed backlogged if there are outstanding packets in the Master or Slave queue). A test is made in decision block 42 to determine if a connection is a type A connection. We give service to the type A connections upon their due turn in the Round Robin methodology in function block 43. When a type B connection is due service, we attempt a transfer of service to type A connections in function block 44 (this is because we want to give more service to Category A).

We define two parameters "Qmin" and "Qmax". "Qmin" is minimum service received by a connection till Current time among all the backlogged connections. Similarly, "Qmax" is the maximum service received by a connection untill current time among all backlogged connections. Qmax and Qmin are continuously updated for the system. It is important to understand why different connections will receive different service. Although we serve all the backlogged connections in Round Robin order, it is the occasional transfer of service from type B connections to type A connections that results in the difference in the amount of service received per connection.

A test is made in decision block 45 to determine if a type A connection has been found. If not, service is given to the current connection in function block 43, and a return is made to function block 41. If, however, a type A connection is found, the service is transferred from the type B connection to the type A connection in function block 46.

To keep track of the service received by a connection we keep track of the excess or deficit from the due fair amount of service a connection should have received in the round robin methodology. This strategy is very useful as it is difficult to maintain total service received by a connection (as it can be a large number). Also, the connections can typically oscillate from having an excess or deficit service. Hence, the value of this excess or deficit always remains small and bounded (and is hence easier to store than total service). The excess or deficit is recorded in a per connection counter.

If a connection receives service on its due turn in the Round Robin order, its counter value is left unchanged. This is so since there has been no excess service received or a deficit. If an type B connection transfers its service to a type A connection, the counter of the type A connection is incremented by one in function block 47, and the counter of the type B connection is decremented by one in function block 48. This reflects the excess service received by the type A connection and the deficit by the type B connection.

To provide fairness among different connections, it is necessary to control the transfer of service from type B connection to type A connections. On each transfer of service, we update the value of Qmin and Qmax in function block 49. This operation is simple as the service values of only two connections can change in a transfer. We allow a transfer of service to take place if after the transfer, (Qmax−Qmin)≦K. The parameter K is predefined for the scheduling methodology. It is parameter K that controls the fairness in a system. The parameter K gives a bound on the maximum unfairness that can be tolerated.

The connections will typically change their states from type A to type B and vice versa. A connection changing from type A to type B will lose the excess service it received by transferring the service to other type A connections. Similarly, a connection switching from type B to type A will get a chance to regain the service lost by it.

Such a transfer of service can be useful in many scenarios. It can typically happen that serving type B connections can lead to resource wastage such as throughput. Thus, we would like to serve more type A connections. However, there are two issues. Firstly, this can only be done to a limit, as otherwise the type B connections may starve. Secondly, to ensure long term fairness the service transferred should be recorded so that the type B connections can be compensated appropriately. The K-Fairness methodology very neatly achieves both these objectives. Furthermore, the methodology is easy to implement and has low implementational overhead.

The excess service received by connections of type A (from type B) is distributed in a Round Robin manner among the type A connections. Generally, the excess service can be distributed in any manner.

EXAMPLE

Figure 5A:
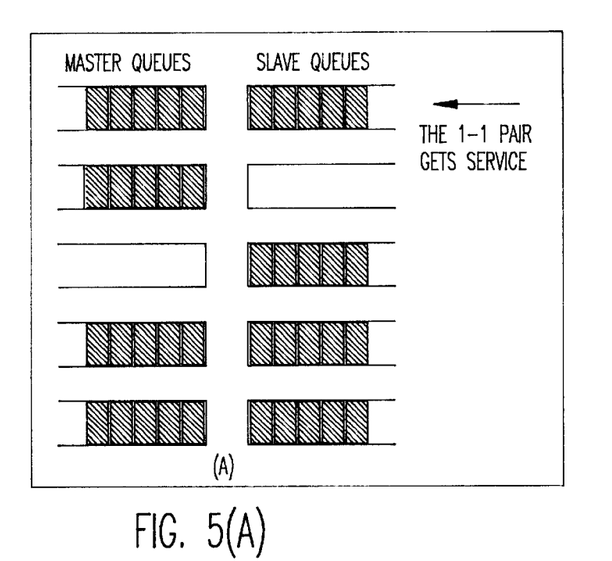
FIGS. 5A and 5B are diagrams illustrating the process of FIG. 4.

To Illustrate the key idea of transferring of service from "1-0" or "0-1" connections (type B) to the "1-1" connection (type A), we present a diagrammatic representation of one iteration of the methodology. In FIG. 5A, we observe that a "1-1" (backlog at both the Master and Slave) connection receives two slots of service on its due turn. This is because type A connections are given service on their due turn.

Figure 5B:
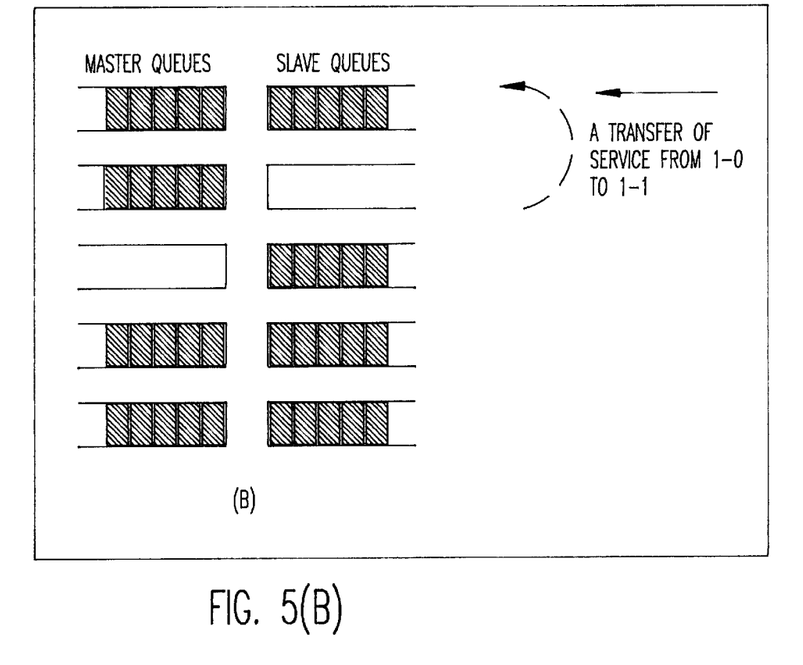

In FIG. 5B, we see a transfer of service from a "1-0" connection (type B) to a "1-1" connection (type A). This has been allowed since the system constraint (Qmax−Qmin)<K is satisfied. After this transfer we will update the service counters of the two pairs, the service counter for "1-1" connection will increment by one (function block 48), whereas service counter of "1-0" connection will decrement by one (function block 47).

Generalized K-Fairness Methodology

Above we have presented the K-Fairness methodology with two categories. It can be easily generalized to "N" categories. The whole methodology proceeds in exactly the same manner. Each Connection has an associated value K(i). Connections in lower categories transfer service to connections in higher categories depending on the value of F(i, Qmax,Qmin,Kl, . . . ,K(N),A). F is a function of different system state parameters such as Qmax, Qmin, i (connection type), K(i) and A (some other parameter). The parameter K(i) can change with time depending on the current system state or past history information. Different Master-Slave pairs can be visited in any order not necessarily Round Robin.

Let the categories be C(0), C(1) . . . C(n), where C(0) is the most preferred category (highest) and C(n) is the least preferred category (lowest). Connections in category C(i) transfer service to connections in category (J) if 1. the constraint F(Qmax,Qmin,i,K(l), . . . ,K(N),A) is satisfied, and
2. there is no connection in category C(k), k<j such that transfer of service can be made without violation of the constraint.

Thus, the transfer of service is made to the highest possible category without violating the constraint. Connections can dynamically change categories.

Scheduling With Variable Size Data Packets and Voice Channels

So far we have considered scheduling with single size data packets (one slot length). In some Master driven TDD systems, variable size data packets are allowed. In these systems, packet sizes of, for example, 1, 3 and 5 slot lengths are allowed. Due to the presence of reserved voice channels, the number of contiguous data slots is reduced to 2 or 4. Data packets can only be transmitted over contiguous slots. Hence, when there is one voice channel, and there are four spare slots between two consecutive voice slots, only 1 and 3 size data packets are allowed at the Master and Slave queues. In this case, we can form three categories of connections based on the size of the packet at the head of Master and Slave queues. We refer to connections on the basis of the packet size at the Master and Slave queues; e.g., a 3-1 connection has a size 3 packet at the Master queue and a size 1 packet at the Slave queue.

1. Category 1: This category comprises of connections which yield maximum slot utilization. Connections of type 3-1, 1-3 and 1-1 will be in this category. These have 100% slot utilization.
2. Category 2: This category comprises of connections of type 3-0, and 0-3. These connections have a 75% slot utilization.
3. Category 3: This category comprises of connections of type 1-0 and 0-1. These connections have a 50% slot utilization.

The K-Fairness Methodology can be used in this case also. Thus, we see that the K-Fairness methodology is applicable in systems with both voice and data traffic.

To compare the performance of different scheduling policies, we have used Discrete Event Simulations. We simulate a piconet consisting of five Slaves and a Master. For each Slave, there is a corresponding queue at the Master. The TDD slot length is equal to 625 micro seconds. In the simulation, we do riot model the voice arrival process explicitly. Instead, since voice has a higher priority than data, voice slots are reserved in the system by the Master. The data arrival process at the Master and Slave queues is assumed to be either (i) Poisson (MP) or (ii) a two-state Markov Modulated Poisson Process (MMPP). For the MMPP process, the transition probability from one state to another is equal to 0.01, and the probability of remaining in a state is 0.99. The service time of a data packet depends upon the packet length. A packet of size one occupies a single slot. Various simulation parameters are shown in Table 1. The arrival rate is in units of packets per TDD slot.

TABLE 1

| Queue Type | M1 | S1 | M2 | S2 | M3 | S3 | M4 | S4 | M5 | S5 |
|---|---|---|---|---|---|---|---|---|---|---|
| Arrival Process | MP | MP | MP | MP | MP | MP | MMPP | MMPP | MMPP | MMPP |
| Arrival Rate | 0.2 | 0.2 | 0.39 | 0.01 | 0.01 | 0.39 | 0.39, 0.01 | 0.39, 0.01 | 0.39, 0.01 | 0.39, 0.01 |

From Table 1, we see that the Master-Slave (M-S) pair 1 has a high arrival rate (equal to 0.2) at both the Master and the Slave queues, and thus will be in the "1-1" state most of the time. M-S Pairs 2 and 3 always have very high arrival rate at one queue and low arrival rate at the other queue and thus will be in "1-0" or "0-1" state most of the time. Pairs with MMPP traffic (4 and 5) at times have a high arrival rate in both the queues or, at times they have a high arrival rate in one queue and a low arrival rate in the other queue, or low arrival rates in both the queues. The buffer size at the Slaves as well as Master queues is taken to be 20 packets. Discrete Event Simulations were run for 5000 TDD slots and the statistics were collected after the first 100 slots to remove any initialization bias in the simulations, if any.

Simulation Results

In this section we present a detailed description of the performance of the two scheduling policies that we have studied for the MAC protocol.

TABLE 2

Performance of K-Fairness Methodology and Round Robin Methodology

| Scheduling Methodology | RR | KFP |
|---|---|---|
| System Throughput (% of slots utilized) | 76.26 | 89.1 |
| Average Packet Delay (in slot units) | 164.13 | 125.34 |
| Total packet drops | 6,291 | 5,853 |

In Table 2, we compare the performance of the K-Fairness Methodology (KFP) and Round Robin (RR). We see from Table 2 that RR performs poorly in terms of throughput (percentage of total system slots utilized) while KFP performs much better. The results for KFP have been shown for K (the fairness parameter) equal to 500.

Figure 6:
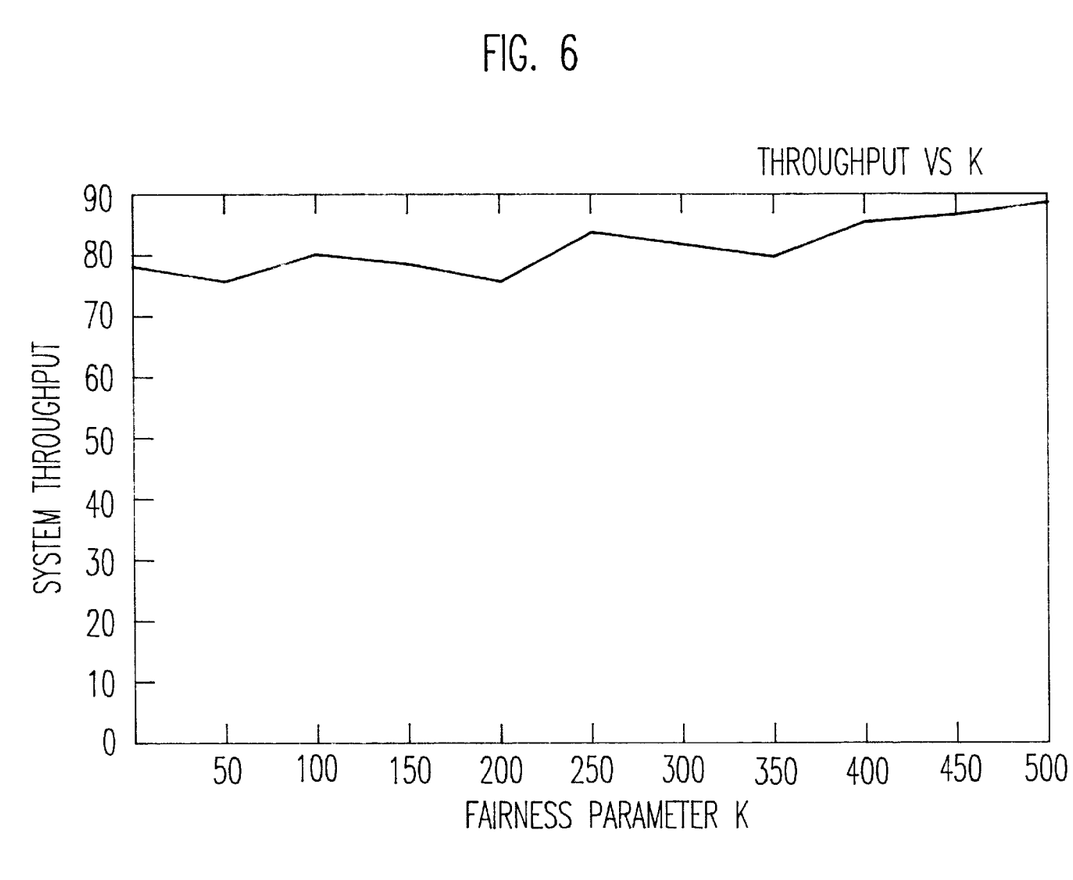
FIG. 6 is a graph plotting simulation results of system throughput versus a fairness parameter.

In FIG. 6 we see the increase in system throughput with the parameter K. As K is increased, the overall system throughput increases significantly. A large value of K signifies that a larger unfairness can be tolerated. Hence, the throughput increases.

Figure 7:
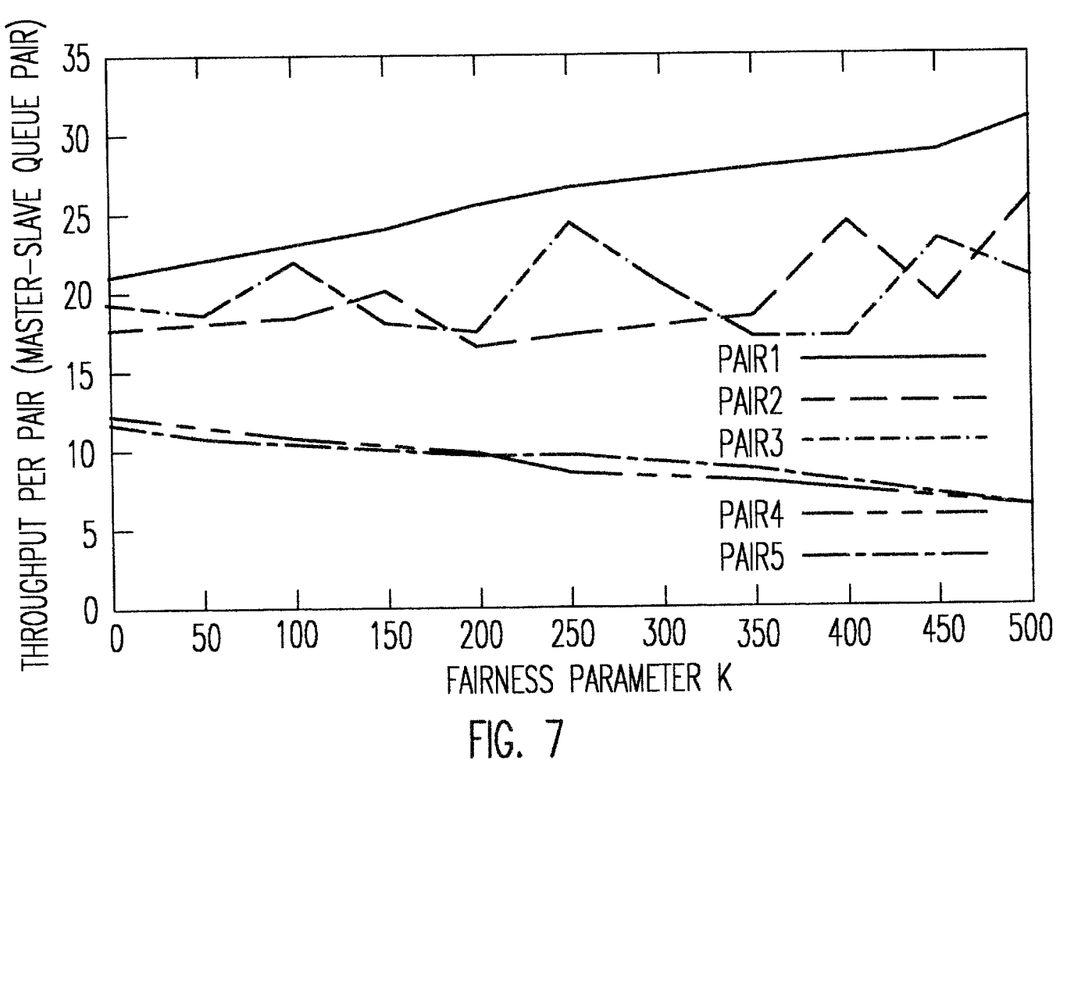
FIG. 7 is a graph plotting simulation results of throughput of different connections versus the fairness parameter.

In FIG. 7, we show throughput of different connections versus "K" in KFP. We see that Master-Slave (M-S) pair 1 gains the most while the M-S pairs 2 and 3 suffer from low throughput. This is because pair 1 has a high arrival rate at both Master and Slave queues (it is in "1-1" state most of the time) while M-S pairs 2 and 3 have a high input rate at one queue but low arrival rate in the other queue of the pair (these pairs stay in "0-1" or "1-0" state most of the time). The performance of the MMPP pairs (4 and 5) lies in between the performance of M-S pair 1 and M-S pairs 2 and 3. This is due to the fact that for these pairs the arrival rate at times is high in both queues (similar to pair 1) while at other times, the arrival rate is high in one queue and low in other queue (similar to pairs 2 and 3). In KFP (FIG. 7), the difference in the throughput for M-S pair (highest throughput) and M-S pairs 2 and 3 (lowest throughput) is bounded due to a strict fairness bound. At very low values of K, the system is very fair. For K=0 all connections receive same service. The difference in throughput is because all connections do not always remain backlogged. As value of K is increased, the difference in throughput among, different connections increases. However, this increase is linear. Thus, we see that by specifying a value of K, we can tightly control the unfairness in the system. Similar performance of the KFP is seen in Average Delays and Total Drops.

Note that the KFP methodology will perform very well when all the arrival processes behave like MMPP; i.e., their arrival rates change with time. This is shown in Table 3, where we have compared the various scheduling policies when all the five Master-Slave pairs have a MMPP arrival process at both the queues. A large category of applications have this kind of a time varying traffic distribution. It is seen that the K-Fairness methodology performs much better with such distributions.

TABLE 3

| Scheduling Methodology | RR | KFP |
|---|---|---|
| Throughput (% of slots utilized) | 83.61 | 97.53 |
| Average Delay (in slot units) | 147.28 | 127.86 |

We have proposed a Media Access Control Scheduling Methodology in Master driven TDD wireless Pico-Cellular systems. This invention provides a scheduling methodology that gives high system throughput and fairness among different connections in a Master driven TDD Wireless system. This methodology is online and simple to implement.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A scheduling methodology for Master driven Time Division Duplex (TDD) wireless systems comprising the steps of:

classifying Master-Slave pairs into categories based on queue size information about Master and Slave queues;

transferring service among different categories of Master-Slave queue pairs; and using a time varying parameter K(i) for each category, bounding the maximum allowed transfer of service from each said category to other categories.

2. The scheduling methodology recited in claim 1, further comprising the step of transferring service based on the state of the system, information about the queue and past history information.

3. The scheduling methodology recited in claim 1, wherein the step of classifying Master-Slave queue pairs is based on queue backlog at Master and Slave where a queue is backlogged if it has packets.

4. The scheduling methodology recited in claim 1, wherein the step of classifying Master-Slave queue pairs is based on the size of Head-of-Line packets at the Master and Slave queues.

5. The scheduling methodology recited in claim 1, further comprising the step of recording excess or deficit service received by categories of Master-Slave queue pairs.

6. The scheduling methodology recited in claim 5, wherein the step of recording is done through the use of counters for each Master-Slave queue pair.

7. The scheduling methodology recited in claim 6, wherein the counters are incremented on receiving excess service and decremented on receiving deficit service.

8. The scheduling methodology recited in claim 1, wherein only increment and decrement operations are required to update the time varying parameter K(i).

9. A Master driven Time Division Duplex (TDD) wireless communication system comprising:

classification means for classifying Master-Slave pairs into categories based on queue size information about Master and Slave queues;

transfer means for transferring service among different categories of Master-Slave queue pairs; and means, using a time varying parameter K(i) for each category, bounding the maximum allowed transfer of service from each said category to other categories.

10. The Master driven Time Division Duplex (TDD) wireless communication system recited in claim 9, wherein the transfer means transfers service based on the state of the system, information about the queue and past history information.

11. The Master driven Time Division Duplex (TDD) wireless communication system recited in claim 9, wherein the classification means classifies Master-Slave queue pairs based on queue backlog at Master and Slave where a queue is backlogged if it has packets.

12. The Master driven Time Division Duplex (TDD) wireless communication system recited in claim 9, wherein the classification means classifies Master-Slave queue pairs based on the size of Head-of-Line packets at the Master and Slave queues.

13. The Master driven Time Division Duplex (TDD) wireless communication system recited in claim 9, further comprising recording means for recording excess or deficit service received by categories of Master-Slave queue pairs.

14. The Master driven Time Division Duplex (TDD) wireless communication system recited in claim 13, wherein the recording means comprises counters for each Master-Slave queue pair.

15. The Master driven Time Division Duplex (TDD) wireless communication system recited in claim 14, wherein the counters are incremented on receiving excess service and decremented on receiving deficit service.

16. The Master driven Time Division Duplex (TDD) wireless communication system recited in claim 9, wherein only increment and decrement operations are required to update the time varying parameter K(i).

\* \* \* \* \*